United States Patent
Yan

(10) Patent No.: US 7,928,159 B2
(45) Date of Patent: Apr. 19, 2011

(54) ENHANCING INTERACTIVITY BETWEEN AMINE-FUNCTIONALIZED POLYMERS AND PARTICULATE FILLERS

(75) Inventor: Yuan-Yong Yan, Copley, OH (US)

(73) Assignee: Bridgestone Corpororation, Tokyo (JP)

( * ) Notice: Subject to any disclaimer, the term of this patent is extended or adjusted under 35 U.S.C. 154(b) by 46 days.

(21) Appl. No.: 11/920,669

(22) PCT Filed: May 26, 2006

(86) PCT No.: PCT/US2006/020888
§ 371 (c)(1),
(2), (4) Date: Nov. 19, 2007

(87) PCT Pub. No.: WO2006/128158
PCT Pub. Date: Nov. 30, 2006

(65) Prior Publication Data
US 2009/0043041 A1 Feb. 12, 2009

Related U.S. Application Data

(60) Provisional application No. 60/684,862, filed on May 26, 2005.

(51) Int. Cl.
*C08L 9/00* (2006.01)
*C08K 3/04* (2006.01)

(52) U.S. Cl. ..... 524/572; 525/375; 525/376; 525/332.9; 525/332.5; 525/331.9; 525/374; 525/379; 525/271; 523/200; 524/495; 524/612; 528/38

(58) Field of Classification Search .................... 528/38; 523/200; 524/495, 572, 612; 525/332.9, 525/332.5, 331.9, 342, 374–376, 271, 379
See application file for complete search history.

(56) References Cited

U.S. PATENT DOCUMENTS

| | | | |
|---|---|---|---|
| 4,300,970 A | 11/1981 | Honda et al. | |
| 4,480,006 A | 10/1984 | Rampf et al. | |
| 4,740,562 A | 4/1988 | Menke et al. | |
| 6,369,167 B1 * | 4/2002 | Morita et al. | 525/342 |
| 6,759,464 B2 * | 7/2004 | Ajbani et al. | 524/445 |
| 6,992,147 B1 | 1/2006 | Ozawa et al. | |
| 7,153,919 B2 * | 12/2006 | Hogan et al. | 526/335 |
| 2004/0254301 A1 * | 12/2004 | Tsukimawashi et al. | 525/271 |
| 2006/0135701 A1 | 6/2006 | Lawson et al. | |
| 2007/0037956 A1 | 2/2007 | Hogan et al. | |
| 2007/0078232 A1 | 4/2007 | Yan | |
| 2007/0149744 A1 | 6/2007 | Yan et al. | |
| 2007/0293622 A1 | 12/2007 | Yan | |

FOREIGN PATENT DOCUMENTS

| | | |
|---|---|---|
| DE | 195 39 653 A1 | 4/1997 |
| EP | 1 790 666 A1 | 5/2007 |
| FR | 2713685 A | 6/1995 |
| WO | WO 94/26815 A1 | 11/1994 |
| WO | WO 2007/015872 A1 | 2/2007 |

OTHER PUBLICATIONS

P.C. Traas et al., "A Versatile Synthesis of α,β-Unsaturated Aldehydes from Tosylhydrazones," *Tetrahedron Letters*, 1976, vol. 26, pp. 2287-2288 (Pergamon Press, Great Britain).
N.S. Narasimhan et al., "Synthetic Application of Lithiation Reactions: Part XIII. Synthesis of 3-Phenylcoumarins and Their Benzo Derivatives," *Synthesis*, 1979, pp. 906-909 (Nov. 1979, Georg Thieme Publishers).
G.A. Olah et al., "Aldehydes by Formylation of Grignard or Organolithium Reagents with N-Formylpiperidine," *Angew. Chem. Int. Ed. Engl.*, 1981, vol. 20, No. 10, pp. 878-879 (Verlag Chemie GmbH; Weinheim, Germany).
G.A. Olah et al., "Formyl Transfer to Grignard Reagents with N-Formylpiperidine: 3-Phenylpropionaldehyde," *Organic Syntheses*, 1986, vol. 64, pp. 114-116 (Organic Syntheses, Inc.).
N. Nagata et al., "Effect of Chemical Modification of Solution-Polymerized Rubber on Dynamic Mechanical Properties in Carbon-Black-Filled Vulcanizates," *Rubber Chem. and Tech.*, 1987, vol. 60, pp. 837-855 (American Chemical Society; Washington, DC).
K. Ueda et al., "Synthesis of Polymers with Amino End Groups. 3. Reactions of Anionic Living Polymers with α-Halo-ω-aminoalkanes with a Protected Amino Functionality," *Macromolecules*, 1990, vol. 23, No. 4, pp. 939-945 (American Chemical Society; Washington, DC).
R.P. Quirk et al., "Anionic Synthesis of Primary Amine-Functionalized Polystyrenes Using 1-[4-[N,N-Bis(trimethylsilyl)amino]phenyl]-1-phenylethylene," *Macromolecules*, 1993, vol. 26, No. 6, pp. 1206-1212 (American Chemical Society; Washington, DC).
R.P. Quirk et al., "Anionic synthesis of ω-dimethylamino-functionalized polymers by functionalization of polymeric organolithiums with 3-dimethylaminopropyl chloride," *Poly. Int.*, 1999, vol. 48, pp. 99-108 (Society of Chemical Industry; London, England). R.P. Quirk et al., "Quantitative Amine Functionalization of Polymeric Organolithium Compounds with 3-Dimethylaminopropyl Chloride in the Presence of Lithium Chloride," *J. Poly. Sci.: Part A: Polymer Chem.*, 2000, vol. 38, pp. 145-151 (J. Wiley & Sons, Inc.; Hoboken, NJ).
R.P. Quirk et al., "Anionic Synthesis of Well-Defined Polymers with Amine End Groups," *Macromol. Symp.*, 2000, vol. 157, pp. 161-169 (Wiley-VCH Verlag GmbH; Weinheim, Germany).
R.P. Quirk et al., "Anionic Synthesis of Secondary Amine Functionalized Polymers by Reaction of Polymeric Organolithiums with N-Benzylidenenethylamine," *Macromol. Chem. Phys.*, 2002, vol. 203, No. 9, pp. 1178-1187 (Wiley-VCH Verlag GmbH; Weinheim, Germany).

* cited by examiner

*Primary Examiner* — Milton I Cano
*Assistant Examiner* — Hannah Pak
(74) *Attorney, Agent, or Firm* — Meredith E. Hooker; David G. Burleson

(57) ABSTRACT

A process for providing interaction between particulate filler and a functionalized polymer involves a composition that includes at least three components: (1) a polymer that includes a functional group including an acidic cation of a primary or secondary amine functionality, (2) a material including a functionality capable of reacting with the acidic cation, and (3) particulate filler. The amine functionality from (1) is allowed to interact with (3) after being neutralized by the action of the acid-reactive functionality from (2). The process is useful in the formation of vulcanizates and articles made therefrom.

20 Claims, No Drawings

ENHANCING INTERACTIVITY BETWEEN AMINE-FUNCTIONALIZED POLYMERS AND PARTICULATE FILLERS

CROSS-REFERENCE TO RELATED APPLICATIONS

This application is a national stage entry of international application no. PCT/US2006/020888, filed 26 May 2006, and claims the benefit of U.S. provisional patent application No. 60/684,862, filed 26 May 2005.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook*, 13th ed. (1990), pp. 603-04.

Typically, filler(s), elastomeric material(s), and additives are chosen so as to provide a composition from which can be made rubber articles with an acceptable compromise or balance of performance properties such as traction, abrasion resistance, hysteresis, etc. Ensuring that reinforcing filler(s) are well dispersed throughout the elastomeric material(s) both enhances processability and acts to improve physical properties. Dispersion of fillers can be improved by increasing their interaction with the elastomer(s). Examples of efforts of this type include high temperature mixing in the presence of selectively reactive promoters, surface oxidation of compounding materials, surface grafting, and chemical modifications to the terminal ends of the polymers.

Where an elastomer is made by anionic polymerization techniques, attachment of certain functional groups is difficult due to the fact that carbanions, such as living polymers, are terminated by active hydrogen atoms such as are present in, e.g., primary and secondary amine groups. However, because amine functional groups provide desirable interaction with particulate fillers, particularly carbon black, commercially useful methods of providing living polymers with terminal amine functionality remain desirable. Because the interactivity with fillers tends to increase as the number of hydrogens bonded to the amino nitrogen increases, the provision of secondary and primary amine-functionalized polymers is particularly desirable.

One procedure for providing amine functionality to anionically initiated polymers is described by K. Ueda et al., "Synthesis of Polymers with Amino End Groups—3. Reactions of Anionic Living Polymers with α-Halo-ω-aminoalkanes with a Protected Amino Functionality," *Macromolecules*, 1990, 23, 939-45. Anionic living polystyrene is reacted with an α-halo-ω-aminoalkane followed by de-protection of the trialkylsilyl-protected amine functionality to provide a primary amino-functionalized polystyrene. The utility of the described procedure is limited by the academic laboratory conditions employed, however. The impact of these limitations on the practical utility of the described procedure is recognized in other academic publications; see, e.g., R. Quirk et al., "Anionic Synthesis of ω-Dimethylamino-Functionalized Polymers by Functionalization of Polymeric Organolithiums with 3-Dimethylaminopropyl Chloride,"*Polym. Int.*, 1999, 48, 99-108.

After a functionalized polymer has been blended with one or more particulate fillers, the resulting filled composition, commonly referred to as rubber stock, often must be stored for some time before being used to make articles therefrom. During the time intermediate creation and use, some characteristics of the rubber stock can be degraded under certain circumstances. Thus, developing methods for enhancing the useful longevity of rubber stock prior to use also is desirable.

SUMMARY OF THE INVENTION

The appended claims set forth a process for maintaining or enhancing the stability of a filled rubber composition employing a polymer that includes a primary or secondary amino functional group.

In one aspect is provided a process for providing interaction between a functionalized polymer and particulate filler in a filled composition. The process can employ a composition that includes a particulate filler, a material that includes acid-reactive functionality, and a polymer which includes at least one functional group that comprises an acidic cation of a primary or secondary amine functionality. The material that includes an acid-reactive functionality can react with the acidic cation so as to provide a functionalized polymer that includes a primary or secondary amine functional group. When the acidic cation is neutralized, free amine functionality becomes available to enable or enhance interactivity between the polymer and the filler.

Advantageously, rubber stock that includes a polymer with acidic cation-protected amine functionality exhibits excellent storage stability. Additionally, when such rubber stock is compounded with a material that includes acid-reactive functionality such as, for example, a curative, an antioxidant, or an antiozonant, the resulting primary or secondary amine functionality group conveniently is made available for interaction with particulate filler such as, e.g., carbon black, upon compounding. These rubber compounds are useful for a variety of purposes including, advantageously, the formation of tire components.

Other aspects of the present invention will be apparent from the detailed description of various embodiments that follows. To assist in understanding that description, certain definitions, which are intended to apply throughout unless the surrounding text explicitly indicates a contrary intention, are provided immediately below:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two monomers and is inclusive of random, block, segmented, graft, etc., copolymers;

"interpolymer" means a polymer that includes mer units derived from at least two monomers and is inclusive of co-, ter-, tetra-polymers, and the like;

"polyene" means a molecule with at least two double bonds located in the longest portion or chain thereof, and specifically includes dienes, trienes, and the like;

"terminus" means an end of a polymer chain;

"terminal", when used as an adjective, means that group or moiety which is located at the terminus of a molecule or polymer chain (for example, a terminal amino group would be an amino group that is located at a terminus);

"protected amino group" means an amino group having an amino nitrogen atom bonded to atoms other than hydrogen but capable of being converted to a primary or secondary amino group, with the proviso that the group does not terminate (i.e., react directly with) a carbanion such as a living polymer;

"drop temperature" is a prescribed upper temperature at which a filled rubber composition (vulcanizate) is evacuated from mixing equipment (e.g., a Banbury mixer) to a mill for being worked into sheets; and "hysteresis" means the difference between the energy applied to deform an article made from an elastomeric compound and the energy released as the article returns to its initial, non-deformed state.

DETAILED DESCRIPTION OF ILLUSTRATIVE EMBODIMENTS

The functionalized polymer includes a polymeric chain with at least one terminal amino functional group. The amino functional group includes at least one hydrogen atom bonded to the amino nitrogen atom, i.e., the amine is primary or secondary. Until the polymer is compounded prior to use, the amino functional group advantageously is present in an acidic cation form.

The polymeric chain can be elastomeric and can include mer units that include unsaturation such as those derived from polyenes, particularly dienes and trienes (e.g., myrcene). Illustrative polyenes include $C_4$-$C_{12}$ dienes, particularly conjugated dienes such as, but not limited to, 1,3-butadiene, isoprene, 1,3-pentadiene, 2,3-dimethyl-1,3-butadiene, and 1,3-hexadiene. Homo- and interpolymers that include just polyene-derived mer units constitute one illustrative type of elastomer.

The polymeric chain also can include pendent aromatic groups such as can be provided through incorporation of mer units derived from vinyl aromatics, particularly the $C_8$-$C_{20}$ vinyl aromatics such as, e.g., styrene, α-methyl styrene, p-methyl styrene, the vinyl toluenes, and the vinyl naphthalenes. When used in conjunction with one or more polyenes, mer units with pendent aromaticity can constitute from about 1% to about 50% by wt., from about 10% to about 45% by wt., or from about 20% to about 35% by wt., of the polymer chain; such interpolymers constitute one exemplary class of polymers. The microstructure of such interpolymers can be random, i.e., the mer units derived from each type of constituent monomer preferably do not form blocks and, instead, are incorporated in a non-repeating, essentially simultaneous manner. Random microstructure can provide particular benefit in certain end use applications such as, e.g., rubber compositions used in the manufacture of tire treads.

Exemplary elastomers include poly(butadiene), (poly)isoprene (either natural or synthesized), and interpolymers of butadiene and styrene such as, e.g., copoly(styrene/butadiene) also known as SBR.

Polyenes can incorporate into polymeric chains in more than one way. Especially for tire tread applications, controlling this manner of incorporation into the polymer (i.e., the 1,2-micro-structure of the polymer) can be desirable. A polymer chain with an overall 1,2-microstructure, based on total polyene content, of from about 10% to about 80%, optionally from about 25% to 65%, can be desirable for certain end use applications.

The number average molecular weight ($M_n$) of the polymer typically is such that a quenched sample exhibits a gum Mooney viscosity ($ML_4$/100° C.) of from about 2 to about 150, more commonly 2.5 to about 50.

The foregoing polymers can be made by emulsion polymerization or solution polymerization, with the latter affording greater control with respect to such properties as randomness, microstructure, etc. Solution polymerizations have been performed since about the mid-20th century, and the general aspects thereof are known to the ordinarily skilled artisan, although certain aspects are provided here for convenience of reference.

Solution polymerization typically involves an initiator. Exemplary initiators include organolithium compounds, particularly alkyllithium compounds. Examples of organolithium initiators include N-lithio-hexamethyleneimine; n-butyllithium; tributyltin lithium; dialkylamino-lithium compounds such as dimethylaminolithium, diethylaminolithium, dipropylaminolithium, dibutylaminolithium and the like; dialkylaminoalkyllithium compounds such as diethylaminopropyllithium; and those trialkyl stanyl lithium compounds involving $C_1$-$C_{12}$, preferably $C_1$-$C_4$, alkyl groups.

Multifunctional initiators, i.e., initiators capable of forming polymers with more than one living end, also can be used. Examples of multifunctional initiators include, but are not limited to, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4'-dilithiobiphenyl.

In addition to organolithium initiators, also useful are the so-called functionalized initiators that become incorporated into the polymer chain, thus providing a functional group at the initiated end of the chain. Examples of such materials include the reaction product of organolithium compounds and, for example, N-containing organic compounds (e.g., substituted aldimines, ketimines, secondary amines, etc.) optionally pre-reacted with a compound such as diisopropenyl benzene. A more detailed description of these materials can be found in, e.g., U.S. Pat. Nos. 5,153,159 and 5,567,815.

Typical solution polymerization solvents include various $C_5$-$C_{12}$ cyclic and acyclic alkanes as well as their alkylated derivatives, certain liquid aromatic compounds, and mixtures thereof. Solvents capable of quenching the polymerization are avoided.

In solution polymerizations, both randomization of the mer units and vinyl content (i.e., 1,2-microstructure) can be increased through inclusion of a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer employed, the reaction temperature, and the nature of the specific coordinator employed. Useful coordinators include organic compounds having a heteroatom with a non-bonded pair of electrons (e.g., O or N). Examples include dialkyl ethers of mono- and oligo-alkylene glycols; crown ethers; tertiary amines such as tetramethylethylene diamine; THF; THF oligomers; linear and cyclic oligomeric oxolanyl alkanes such as 2,2'-di(tetrahydrofuryl)propane, di-piperidyl ethane, hexamethylphosphoramide, N,N'-dimethylpiperazine, diazabicyclo-octane, diethyl ether, tributylamine, and the like. Details of linear and cyclic oligomeric oxolanyl coordinators can be found in U.S. Pat. No. 4,429,091, the teaching of which relating to the manufacture and use of such materials is incorporated by reference.

Although the ordinarily skilled artisan understands the type of conditions typically employed in solution polymerization, a representative description is provided for the convenience of the reader. The following is based on a batch process, although extending this description to, e.g., semi-batch or continuous processes is within the capability of the ordinarily skilled artisan.

Polymerization typically begins by charging a blend of monomer(s) and solvent to a suitable reaction vessel, followed by addition of the coordinator (if used) and initiator, which often are added as part of a solution or blend; alternatively, monomer(s) and coordinator can be added to the initiator. Anhydrous, anaerobic conditions typically are employed. The reactants can be heated to a temperature of up to about 150° C. and agitated. After a desired degree of conversion has been reached, the heat source (if used) can be removed. If the reaction vessel is to be reserved solely for polymerizations, the reaction mixture can be removed to a post-polymerization vessel for functionalization and/or quenching.

At this point, the reaction mixture commonly is referred to as a "polymer cement" because of its relatively high concentration of polymer, typically at least double the concentrations encountered in the types of lab scale polymerizations discussed above in the Background section.

The polymer is provided with an amino functional group prior to being quenched. This functionalization can be effected by introducing to the polymer cement a compound that includes at least one protected amino group. The ordinarily skilled artisan can envision many such compounds, but two broad categories are discussed below for purpose of illustration.

One such material includes, in addition to a protected amino group, at least one electrophilic functionality; these materials are referred to below as category A reactants. A convenient electrophilic group is a halogen atom (preferably Cl, Br, or I), which can react readily with the countercation of the living anionic polymer, typically an alkali metal ion such as $Li^+$. In such materials, the nitrogen atom of the protected amino group can bond to groups that generally are not reactive toward living anionic polymers yet can be removed selectively and completely under conditions that do not degrade such polymers. Examples of such materials include the class of materials known as aza-disilacycloalkanes, particularly those where the ring structure includes 5 or 6 atoms and those where each Si atom is di-substituted; specific examples include 1-(3-halopropyl)-2,2,5,5-tetramethyl-1-aza-2,5-disilacyclopentane, 1-(3-halopropyl)-2,2,5,5-tetraethyl-1-aza-2,5-disilacyclopentane, 1-(3-halopropyl)-2,2,6,6-tetramethyl-1-aza-2,6-disilacyclopentane, 1-(3-halo-propyl)-2,2,6,6-tetraethyl-1-aza-2,6-disilacyclohexane, 1-(2-haloethyl)-2,2,5,5-tetramethyl-1-aza-2,5-disilacyclopentane, and the like. The halogen atom can be spaced from the amino nitrogen by a $C_2$-$C_3$ alkyl chain, and the alkyl groups attached to the Si atoms can be (independently) $C_1$-$C_2$ alkyl groups. For reasons including cost and commercial availability, a preferred category A reactant is 1-(3-bromopropyl)-2,2,5,5-tetramethyl-1-aza-2,5-disilacyclopentane. Because of the reactivity of living polymers with electrophilic moieties such as a halogen atom, the reaction of this type of material with the living polymer can be performed quickly (e.g., ~15-60 min.) using relatively mild conditions (e.g., ~25°-75° C. and atmospheric or slightly elevated pressures).

A living polymer with a protected amino functional group also can be provided by reacting the living polymer with a compound that includes at least one —NR'—C(Z)— portion, e.g., a heterocyclic compound that includes within its ring structure one or more —NR'—C(Z)— units, where Z can be S or O and R' is an alkyl or aryl group; these materials are referred to below as category B reactants. The size of the ring structure is not believed to be critical, although compounds with 5- through 8-membered rings typically are among the most readily available. In these compounds, the bond between the substituted nitrogen atom and the carbonyl group tends to open readily in the presence of a carbanion such as a living polymer; this provides a convenient mechanism for introducing a protected amino functional group into a living polymer. Specific examples of category B reactants include N-substituted lactams such as N-methyl-β-propiolactam, N-tert-butyl-β-propiolactam, N-phenyl-β-propiolactam, N-naphthyl-β-propiolactam, N-methyl-ϵ-caprolactam, N-phenyl-ϵ-caprolactam, N-vinyl-ϵ-caprolactam, N-benzyl-ϵ-caprolactam, N-naphthyl-ϵ-caprolactam, N-methyl-ω-laurylolactam, N-phenyl-ω-laurylolactam, N-tert-butyl-ω-laurylolactam, N-vinyl-ω-laurylolactam, N-benzyl-ω-laurylolactam, N-methyl-octalactam, and the like; pyrrolidinones (often referred to as pyrollidones) such as N-methyl-2-pyrrolidone, N-tert-butyl-2-pyrrolidone, N-phenyl-2-pyrrolidone, N-vinyl-2-pyrrolidone, N-benzyl-2-pyrrolidone, N-naphthyl-2-pyrrolidone, N-methyl-5-methyl-2-pyrrolidone, N-tert-butyl-5-methyl-2-pyrrolidone, N-phenyl-5-methyl-2-pyrrolidone, and the like; imidazolidinones such as, e.g., 1,3-dialkyl-2-imidazolidinone; piperidones such as N-methyl-2-piperidone, N-tert-butyl-2-piperidone, N-phenyl-2-piperidone, N-methoxyphenyl-2-piperidone, N-vinyl-2-piperidone, N-benzyl-2-piperidone, N-naphthyl-2-piperidone, and the like; and pyrimidinones such as, e.g., 1,3-dimethyl-3,4,5,6-tetrahydro-2(1H)-pyrimidinone. (Although each of the foregoing examples utilizes O as Z, the corresponding compounds where Z is S also can be mentioned as exemplary materials.)

When category A and/or B reactant materials are added to a carbanionic living polymer, they react at the location of the anion, typically the end of the longest polymeric chain. Where a multifunctional initiator is employed during polymerization, reaction with the foregoing types of compounds can occur on each terminus of the polymer.

Mixing of a type commonly employed in commercial processes is sufficient to ensure near stoichiometric reaction between the living polymer and the compound(s) that provides a protected amino functional group.

Advantageously, the protected amino functional group can be de-protected conveniently through hydrolysis, typically effected through the introduction of an acid. With respect to category A reactants, a strong inorganic protonic acid can be delivered in, e.g., a polar organic solvent. Use of a relatively strong protonic acid typically ensures extensive, often complete, de-protection. In other words, the previously di-substituted nitrogen atom from the category A reactant (commonly located at the terminus of the polymer) yields an acidic cation, i.e., a —$NH_3^+$ group, and the carbanion becomes a polymer that includes an acidic cation of a primary amine functionality.

With respect to category B reactants, acidic hydrolysis yields an acidic cation, i.e., a —$NRH_2^+$ group, and the carbanion becomes a polymer that includes an acidic cation of a secondary amine functionality.

An amine salt (i.e., an acidic cation of primary or secondary amine functionality) can exhibit less interactivity with particulate filler than the corresponding primary or secondary (free) amine. Accordingly, neutralization (i.e., de-protonation) can be desirable. However, as is discussed in more detail below, neutralization need not be performed on the polymer cement and, instead, the polymer preferably undergoes additional processing prior to neutralization of its amine salt(s). This additional processing optionally can begin with quenching and/or desolventization.

Quenching typically is conducted by stirring the polymer and an active hydrogen-containing compound (e.g., an alcohol) for up to about 120 minutes at temperatures of from about 30° C. to 150° C. Solvent can be removed by conventional techniques such as drum drying, extruder drying, vacuum drying or the like, which may be combined with coagulation with water, alcohol or steam, thermal desolvation, etc.; if coagulation is performed, oven-drying may be desirable. Drum drying can help to protect the acidic cation of the amine functionality and, if coagulation is utilized, maintaining neutral or very slightly acidic conditions can be preferable.

After desolventization, the resulting polymer often is stored in the form of blocks or slabs. By allowing the amino functionality of the polymer to remain in the aforementioned acidic cation form, the amino functionality is protected against undesirable coupling, i.e., dimerization, caused by oxidation. In other words, the N atom in the amine salt form is less susceptible to oxidation and the resulting coupling that often follows.

The functionalized polymer can be utilized in a tread stock compound or can be blended with any conventionally employed tread stock rubber including natural rubber and/or non-functionalized synthetic rubbers such as, e.g., one or more of poly(isoprene), SBR, poly(butadiene), butyl rubber, neoprene, ethylene/propylene rubber (EPR), ethylene/propylene/diene rubber (EPDM), acrylonitrile/butadiene rubber (NBR), silicone rubber, fluoroelastomers, ethylene/acrylic rubber, ethylene/vinyl acetate interpolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from about 5 to about 99% by wt. of the total rubber, with the conventional rubber(s) making up the balance of the total rubber. The minimum amount depends to a significant extent on the degree of hysteresis reduction desired.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in J. Am. Chem. Soc., vol. 60, p. 309 et seq.) is a recognized method for determining surface area. BET surface area of silicas generally is less than 450 $m^2/g$, and useful ranges of surface are include from about 32 to about 400 $m^2/g$, about 100 to about 250 $m^2/g$, and about 150 to about 220 $m^2/g$.

The pH of the silica filler is generally from about 5 to about 7 or slightly over, preferably from about 5.5 to about 6.8.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J. M. Huber Corp. (Edison, N.J.).

Silica can be employed in an amount of about 1 to about 100 parts by weight (pbw) per 100 parts of polymer (phr), preferably in an amount from about 5 to about 80 phr. The useful upper range is limited by the high viscosity imparted by such fillers.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least about 35 to about 200 $m^2/g$ or higher are preferred; surface area values can be determined by ASTM D-1765 using the cetyltrimethyl-ammonium bromide (CTAB) technique. The carbon blacks may be in pelletized form or an unpelletized flocculent mass.

The amount of carbon black can be up to about 50 phr, with about 5 to about 40 phr being typical. When carbon black is used with silica, the amount of silica can be decreased to as low as about 1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of about 25%; accordingly, typical (combined) amounts of reinforcing fillers, i.e., silica and carbon black, is about 30 to 100 phr.

When silica is employed as a reinforcing filler, addition of a coupling agent such as a silane is customary so as to ensure good mixing in, and interaction with, the elastomer(s). Generally, the amount of silane that is added ranges between about 4 and 20% by weight, based upon the weight of silica filler present in the elastomeric compound.

Coupling agents can have a general formula of Q-T-X, in which Q represents a functional group capable of bonding physically and/or chemically with a group on the surface of the silica filler (e.g., surface silanol groups); T represents a hydrocarbon group linkage; and X represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the X and Q functionalities mentioned above. One preferred coupling agent is bis[3-(triethoxysilyl)propyl]tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants are also useful, as set forth below. The additional fillers can be utilized in an amount of up to about 40 phr, preferably up to about 20 phr.

Other conventional rubber additives also can be added. These include, for example, process oils, plasticizers, antidegradants such as antioxidants and antiozonants, curing agents and the like.

All of the ingredients can be mixed using standard equipment such as, e.g., Banbury or Brabender mixers. Typically, the initial mixing (i.e., that which is not intended to immediately precede vulcanization) occurs at a temperature between about 140° and 160° C., often between about 145° and 155° C.

Advantageously, some of the aforementioned additives, including particularly (but not necessarily limited to) certain curing agents and anti-degradants, are basic in nature due to, e.g., the presence of functionalities that include NH-containing moieties (e.g., amines and amides). For example, as described in more detail in conjunction with Tables 1a and 1b below, typical anti-oxidants include amines such as, e.g., N-phenyl-N'-(1,3-dimethylbutyl)-p-phenyldiamine, and typical accelerators (i.e., curing agents) include amides such as, e.g., benzothiazyl-2-cyclohexylsulfenamide, di(phenylthio)acetamide, etc., and amidines such as, e.g., N,N'-diphenyl guanidine.

After being mixed with the functionalized polymer(s), these types of basic additives contact the amine salts and, in effect, neutralize the acidic amino cation, thereby creating free amine functionality. This neutralization typically does not require additional effort or processing steps, i.e., it can occur naturally during the aforementioned mixing and storage of the resulting rubber stock, regardless of form (e.g., slab, wigwag, etc.).

If desired, one can include in the mixed components a strong inorganic base, a mixed base system such as pyridine/NaOH, or a very strong organic base such as a tetraalkylammonium hydroxide (e.g., $(CH_3)_4NOH$). However, use of such additional bases has not been found to be necessary under most circumstances.

Neutralization results in polymers with primary or secondary amino functional groups, optimally located at a terminus of a polymer. Both have been found to provide significant inter-activity with particulate fillers, although the effect of primary amino functional groups seems to be particularly high.

Reinforced rubber compounds conventionally are cured with about 0.2 to about 5 phr of one or more known vulcanizing agents such as, for example, sulfur or peroxide-based curing systems. For a general disclosure of vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Sulfur curing typically occurs at about 170° C. and, accordingly, curing components typically are mixed at a temperature that is ~10-20° C. higher than that employed in the initial mixing discussed above.

The presence of acidic cation-protected amine functionality can impact mixing in a positive manner. In at least some circumstances, the presence of polymers with acidic cation-protected amine functionality has been found to lower the temperature required during initial mixing (i.e., masterbatch stage) and, upon partial or full neutralization of the acidic cation so as to provide polymer with free amine functionality, raise the drop temperature during final mixing. Both of these effects typically are desirable; specifically, less energy (heat) is required for initial mixing (which, in addition to the obvious cost and environmental impact benefits, reduces the chance that the polymeric materials will be degraded or prematurely vulcanized) and higher drop temperatures mean typically mean faster cure times, less time in the mixing equipment (where degradation can occur), and increased production rates.

The following non-limiting, illustrative examples provide the reader with detailed conditions and materials that can be useful in the practice of the present invention.

EXAMPLES

In the following examples, dried glass vessels previously sealed with extracted septum liners and perforated crown caps under a positive $N_2$ purge were used for all preparations. Butadiene, styrene (33% by wt. in hexane), hexane, n-butyllithium, oligomeric oxolanyl propanes (1.6 M solution in hexane, stored over $CaH_2$), and butylated hydroxytoluene (BHT) solution in hexane were used.

The following commercially available reagents and starting materials, all of which were acquired from Sigma-Aldrich Co. (St. Louis, Mo.), were used without further purification unless otherwise noted: 1-(3-bromopropyl)-2,2,5,5-tetramethyl-1-aza-2,5-disilacyclopentane (97% purity) and methyltriethoxysilane (99% purity), and pyridine (99% purity).

Testing data in the Examples was performed on filled compositions made according to the formulations shown in Tables 1a and 1b in which N-phenyl-N'-(1,3-dimethylbutyl)-p-phenyl-diamine acts as an antioxidant while benzothiazyl-2-cyclohexylsulfenamide, N,N'-diphenyl guanidine, and di(phenylthio)acetamide act as accelerators. Each of these materials is an amine and, as described above, can act to neutralize the acidic cation of the amine functionality.

TABLE 1a

Compound formulation, carbon black only

| | Amount (phr) |
|---|---|
| Masterbatch | |
| Polymer | 100 |
| carbon black (N343 type) | 55 |
| wax | 1 |
| N-phenyl-N'-(1,3-dimethylbutyl)-p-phenyldiamine | 0.95 |
| ZnO | 2.5 |
| stearic acid | 2 |
| aromatic processing oil | 10 |
| Final | |
| sulfur | 1.3 |
| benzothiazyl-2-cyclohexylsulfenamide | 1.7 |
| N,N'-diphenyl guanidine | 0.2 |
| TOTAL | 174.65 |

TABLE 1b

Compound formulation, carbon black and silica

| | Amount (phr) |
|---|---|
| Masterbatch | |
| Polymer | 100 |
| Silica | 30 |
| carbon black (N343 type) | 35 |
| N-phenyl-N'-(1,3-dimethylbutyl)-p-phenyldiamine | 0.95 |
| stearic acid | 1.5 |
| aromatic processing oil | 10 |
| Re-mill | |
| 60% disulfide silane on carrier | 4.57 |
| Final | |
| ZnO | 2.5 |
| Sulfur | 1.7 |

TABLE 1b-continued

Compound formulation, carbon black and silica

| | Amount (phr) |
|---|---|
| benzothiazyl-2-cyclohexylsulfenamide | 1.5 |
| di(phenylthio)acetamide | 0.25 |
| N,N'-diphenyl guanidine | 0.2 |
| TOTAL | 188.47 |

Data corresponding to "50° C. Dynastat tan δ" were acquired from tests conducted on a Dynastat™ mechanical spectrometer (Dynastatics Instruments Corp.; Albany, N.Y.) using the following conditions: 1 Hz, 2 kg static mass and 1.25 kg dynamic load, a cylindrical (9.5 mm diameter×16 mm height) vulcanized rubber sample, and 50° C.

Data corresponding to "Bound Rubber" were determined using the procedure described by J. J. Brennan et al., *Rubber Chem. and Tech.*, 40, 817 (1967).

Examples 1-6

To a $N_2$-purged reactor equipped with a stirrer was added 1.37 kg hexane, 0.41 kg styrene, and 2.71 kg butadiene (20.1% by wt. in hexane). The reactor was charged with 3.68 mL n-BuLi (1.54 M in hexane), followed by 1.08 mL OOPs (in hexane). The reactor jacket was heated to 50° C. and, after ~25 minutes, the batch temperature peaked at ~62° C. After an additional 15 minutes, the polymer cement was transferred from the reactor to dried glass vessels.

Three samples were terminated with, respectively, methyltriethoxysilane (sample 2), 1-(3-bromopropyl)-2,2,5,5-tetramethyl-1-aza-2,5-disilacyclopentane (sample 3), and a 1:1 blend of methyltriethoxysilane and 1-(3-bromopropyl)-2,2,5,5-tetramethyl-1-aza-2,5-disilacyclopentane (sample 4) in a 50° C. bath for 30 minutes. Another sample was first reacted with hexamethylcyclotrisiloxane before being terminated with 2,2,5,5-tetramethyl-1-aza-2,5-disilacyclopentane (sample 5). These and a non-functionalized polymer (sample 1) were coagulated in isopropanol containing BHT and drum dried.

A portion of the polymer bearing a terminal protected amino functional group (sample 3) was hydrolyzed with 1% HCl in THF (~1 hour at room temperature), followed by neutralization with a blend of pyridine and NaOH over a few minutes at room temperature, to provide an unprotected primary amino functional group-terminated polymer (identified as sample 6 below).

Using the formulations shown in Tables 1a and 1b, vulcanizable elastomeric compounds containing reinforcing fillers were prepared from samples 1-6. Results of physical testing on these compounds are shown below in Table 2. For those rows that include two data points, the upper is for a formulation from Table 1a, and the lower is for a formulation from Table 1b.

TABLE 2

Testing data from Examples 1-6

| | 1 | 2 | 3 | 4 | 5 | 6 |
|---|---|---|---|---|---|---|
| $M_n$ (kg/mol) | 114 | 112 | 134 | 128 | 114 | 145 |
| $M_w/M_n$ | 1.06 | 1.05 | 1.17 | 1.16 | 1.06 | 1.34 |
| % coupling | 0 | 12.3 | 30.7 | 22.9 | 3.0 | 40.4 |
| $T_g$ (° C.) | −36.9 | −37.8 | −37.8 | −37.8 | −37.8 | −37.7 |
| Bound rubber (%) | 16.7 | 22.8 | 40.2 | 34.2 | 15.3 | 47.9 |
| | 17.9 | 77.9 | 60.2 | 34.9 | 74.7 | 44.2 |
| 171° C. MDR $t_{50}$ (min) | 2.9 | 2.7 | 2.8 | 2.8 | 2.8 | 2.5 |
| | 6.9 | 6.1 | 5.4 | 5.1 | 6.3 | 3.8 |
| 171° C. MH-ML (kg-cm) | 19.0 | 19.6 | 17.8 | 18.6 | 18.8 | 17.5 |
| | 24.5 | 17.0 | 20.6 | 24.8 | 16.9 | 23.5 |
| $ML_{1+4}$ @ 130° C. | 28.8 | 35.1 | 58.7 | 45.7 | 29.0 | 66.0 |
| | 66.0 | 92.4 | 93.7 | 101.3 | 92.2 | 101.8 |
| 300% modulus @ 23° C. (MPa) | 11.4 | 11.5 | 13.1 | 12.9 | 10.7 | 15.4 |
| | 9.0 | 13.4 | 13.3 | 11.3 | 13.3 | 12.8 |
| Tensile strength @ 23° C. (MPa) | 18.5 | 18.5 | 19.3 | 20.4 | 16.5 | 19.1 |
| | 13.3 | 16.8 | 17.1 | 15.7 | 16.3 | 15.7 |
| Temp. sweep 0° C. tan δ | 0.194 | 0.194 | 0.216 | 0.201 | 0.188 | 0.236 |
| | 0.184 | 0.250 | 0.228 | 0.197 | 0.249 | 0.206 |
| Temp. sweep 50° C. tan δ | 0.259 | 0.246 | 0.196 | 0.221 | 0.247 | 0.149 |
| | 0.226 | 0.176 | 0.188 | 0.194 | 0.185 | 0.187 |
| RDA 0.25-14% ΔG' (MPa) | 4.780 | 4.410 | 1.148 | 2.157 | 5.095 | 0.962 |
| | 8.470 | 2.470 | 2.671 | 5.198 | 2.544 | 3.964 |
| 50° C. RDA strain sweep (5% strain) tan δ | 0.2491 | 0.2359 | 0.1357 | 0.1752 | 0.2417 | 0.1129 |
| | 0.2230 | 0.1662 | 0.1581 | 0.1712 | 0.1641 | 0.1517 |
| 50° C. Dynastat tan δ | 0.2366 | 0.2206 | 0.1353 | 0.1677 | 0.2295 | 0.1139 |
| | 0.2046 | 0.1555 | 0.1604 | 0.1736 | 0.1573 | 0.1585 |

From the 50° C. strain sweep data of Table 2, one can see that a styrene/butadiene interpolymer having a terminal protected amino functional group (Example 3) can provide, compared to a control polymer, ~45% reduction in tan δ when used in a carbon black-filled formulation while an unprotected (i.e., primary) amino functional group (Example 6) can provide, compared to a control polymer, ~55% reduction in tan δ in a similar formulation.

From the tan δ at 0° C. data in Table 2 (carbon black only formulation), one can see that the highest value, corresponding generally to better wet traction, is provided by the composition containing a polymer having a terminal unprotected amino functional group (Example 6).

While the foregoing data came from a filled composition that was neutralized immediately after de-protection, the data show that free primary amine functionality can provide significant benefits for properties such as, e.g., hysteresis reduction.

Examples 7-10

The procedure described with respect to Examples 1-6 was, in substantial part, repeated. The following materials were used as terminating agents:
  7—isopropanol (control),
  8—tetraethoxysilane (comparative), and
  9 & 10—1-(3-bromopropyl)-2,2,5,5-tetramethyl-1-aza-2,5-disilacyclopentane.

Sample 10 was de-protected by the hydrolysis-neutralization scheme set forth above in Examples 1-6.

Using the formulations shown in Tables 1a and 1b above, vulcanizable elastomeric compounds containing reinforcing fillers were prepared from samples 7-10. Results of physical testing on these compounds are shown below in Table 3.

TABLE 3

Testing data from Examples 7-10

|  | 7 | 8 | 9 | 10 |
|---|---|---|---|---|
| $M_n$ (kg/mol) | 106 | 120 | 116 | 78 |
| $M_w/M_n$ | 1.06 | 1.50 | 1.28 | 1.80 |
| % coupling | 0 | 19.2 | 38.7 | 83.8 |
| $T_g$ (° C.) | −36.5 | −36.9 | −36.6 | −36.9 |
| Bound rubber (%) | 12.0 | 21.6 | 38.3 | 35.5 |
|  | 15.5 | 37.1 | 32.1 | 34.6 |
| 171° C. MDR $t_{50}$ (min) | 2.9 | 2.8 | 2.9 | 2.7 |
|  | 7.5 | 7.7 | 5.2 | 5.7 |
| 171° C. MH-ML (kg-cm) | 17.4 | 17.2 | 16.9 | 17.3 |
|  | 23.0 | 20.9 | 23.8 | 25.0 |
| $ML_{1+4}$ @ 130° C. | 26.2 | 33.1 | 60.0 | 60.0 |
|  | 62.5 | 67.0 | 120.0 | 117.0 |
| 300% modulus @ 23° C. (MPa) | 10.6 | 11.0 | 13.3 | 13.2 |
|  | 9.1 | 10.0 | 10.5 | 11.7 |
| Tensile strength @ 23° C. (MPa) | 17.9 | 19.0 | 19.1 | 18.9 |
|  | 13.4 | 14.8 | 15.8 | 14.2 |
| Temp. sweep 0° C. tan δ | 0.212 | 0.209 | 0.236 | 0.237 |
|  | 0.184 | 0.196 | 0.188 | 0.192 |
| Temp. sweep 50° C. tan δ | 0.273 | 0.264 | 0.195 | 0.197 |
|  | 0.221 | 0.232 | 0.195 | 0.194 |
| RDA 0.25-14% ΔG' (MPa) | 4.496 | 3.672 | 0.923 | 0.981 |
|  | 9.638 | 5.878 | 5.493 | 6.449 |
| 50° C. RDA strain sweep (5% strain) tan δ | 0.2514 | 0.2282 | 0.1280 | 0.1162 |
|  | 0.2235 | 0.2009 | 0.1695 | 0.1666 |
| 50° C. Dynastat tan δ | 0.2421 | 0.2226 | 0.1277 | 0.1237 |
|  | 0.2087 | 0.2015 | 0.1735 | 0.1727 |

From the 50° C. strain sweep data of Table 3 (carbon black only formulation), one can see that a styrene/butadiene interpolymer having a terminal protected amino functional group (Example 9) again provides, compared to a control polymer, a nearly 50% reduction in tan δ while an unprotected (i.e., primary) amino functional group (Example 10) again provides, compared to a control polymer, a nearly 55% reduction in tan δ. The 50° C. strain sweep data (carbon black+silica formulation) show that the same polymers with a terminal amino functional groups (Examples 9 and 10) both exhibit greater than a 15% reduction in tan δ compared to a similar TEOS terminated-polymer.

Examples 11-15

To a $N_2$-purged reactor equipped with a stirrer was added 1.64 kg hexane, 0.41 kg styrene, and 2.43 kg butadiene (22.4% by wt. in hexane). The reactor was charged with 3.56 mL n-BuLi (1.60 M in hexane), followed by 1.05 mL OOPs (in hexane). The reactor jacket was heated to 50° C. and, after ~28 minutes, the batch temperature peaked at ~64° C. After an additional 25 minutes, the polymer cement was transferred from the reactor to dried glass vessels.

Two samples each were terminated with, respectively, 1-methyl-2-pyrrolidinone (samples 12-13) and 1,3-dimethyl-2-imidazolidinone (samples 14-15). One of each of these (samples 13 and 15) also were treated with 1% HCl in THF (~30 minutes at room temperature). These and a non-functionalized polymer (sample 11) were coagulated in isopropanol containing BHT and drum dried.

Using the formulation shown in Table 1a, vulcanizable elastomeric compounds containing reinforcing fillers were prepared from samples 11-15. The compounds were stored at room temperature (~23° C.) for 15 days prior to being tested. Results of physical testing are shown below in Table 4.

TABLE 4

Testing data from Examples 11-15

|  | 11 | 12 | 13 | 14 | 15 |
|---|---|---|---|---|---|
| $M_n$ (kg/mol) | 113 | 97 | 101 | 71 | 74 |
| $M_w/M_n$ | 1.04 | 1.12 | 1.43 | 1.15 | 1.20 |
| $T_g$ (° C.) | −36.9 | −37.1 | −36.8 | −37.1 | −37.2 |
| Bound rubber (%) | 13.6 | 44.0 | 42.0 | 38.2 | 38.8 |
| 171° C. MDR $t_{50}$ (min) | 3.0 | 2.7 | 2.9 | 2.2 | 2.3 |
| 171° C. MH-ML (kg-cm) | 18.0 | 16.0 | 16.0 | 16.5 | 16.1 |
| $ML_{1+4}$ @ 130° C. | 27.3 | 63.4 | 63.7 | 42.2 | 41.8 |
| 300% modulus @ 23° C. (MPa) | 10.9 | 14.5 | 14.2 | 13.8 | 12.7 |
| Tensile strength @ 23° C. (MPa) | 18.3 | 20.3 | 21.5 | 21.6 | 20.6 |
| Temp. sweep 0° C. tan δ | 0.215 | 0.285 | 0.273 | 0.264 | 0.257 |
| Temp. sweep 50° C. tan δ | 0.280 | 0.148 | 0.159 | 0.193 | 0.190 |
| RDA 0.25-14% ΔG' (MPa) | 6.137 | 0.715 | 0.747 | 0.789 | 0.705 |
| 50° C. RDA strain sweep (5% strain) tan δ | 0.267 | 0.110 | 0.115 | 0.125 | 0.124 |
| 50° C. Dynastat tan δ | 0.2541 | 0.1138 | 0.1161 | 0.1305 | 0.1255 |

As mentioned in the Description section above, amine salts (i.e., acidic cations of primary or secondary amine functionality) are known to exhibit reduced interactivity with particulate filler relative to the corresponding primary or secondary (free) amine. However, in the 50° C. strain sweep data of Table 4, the difference in hysteresis reduction between samples 12 and 13 (N-methyl-pyrrolidone) and between samples 14 and 15 (N,N-dimethylimidazoline) is negligible, indicating similarity between the functionalities attached to the polymers. This seems to indicate that the acid-reactive functionalities contained in, e.g., the anti-degradants and/or accelerators, neutralized the acidic cations from samples 13 and 15 and created free amine functionality similar to that already present in samples 12 and 14.

That which is claimed is:

1. A process for providing interaction between a functionalized polymer and particulate filler in a filled composition that comprises (1) a polymer comprising at least one functional group that comprises an acidic cation of a primary or secondary amine functionality, (2) a material comprising acid-reactive functionality, and (3) a particulate filler, said process comprising:
   a) allowing said material to react with the acidic cation of said polymer (1) so as to provide a functionalized polymer comprising a primary or secondary amine functional group; and
   b) allowing the amine functional group of said functionalized polymer to interact with the particulate filler.

2. The process of claim 1 wherein said polymer (1) is an elastomer.

3. The process of claim 1 wherein said polymer (1) comprises a terminal functional group.

4. The process of claim 3 wherein said terminal functional group is located at a terminus of the longest chain of said polymer (1).

5. The process of claim 1 wherein said polymer (1) comprises a hydrolysis product of a functionality comprising at least one protected amino group.

6. The process of claim 5 wherein said functionality comprises an aza-disilacycloalkane.

7. The process of claim 6 wherein said aza-disilacycloalkane comprises a 5- or 6-membered ring and di-substituted silicon atoms.

8. The process of claim 5 wherein said polymer (1) comprises primary or secondary amine functionality.

9. The process of claim 5 wherein said functionality comprises the radical of a heterocyclic compound comprising within its ring structure a —NR—C(Z)— segment, wherein Z is S or O and R is an alkyl or aryl group.

10. The process of claim 9 wherein said functionality comprises an imidazolidinone or a pyrrolidinone radical.

11. The process of claim 1 wherein said material comprises basic functionality.

12. The process of claim 11 wherein said material additionally is capable of acting as at least one of a curative, an antioxidant, and an antiozonant for said composition.

13. The process of claim 11 wherein said material comprises amine functionality.

14. The process of claim 1 further comprising mixing and forming a vulcanizate from said filled composition.

15. The process of claim 14 further comprising forming a tire component from said vulcanizate.

16. The process of claim 2 wherein said elastomer comprises mer units comprising unsaturation.

17. The process of claim 16 wherein said elastomer further comprises mer units comprising pendent aromatic functionality.

18. The process of claim 16 wherein said mer units are derived from one or more types of conjugated diene.

19. The process of claim 1 wherein said composition further comprises a non-functionalized rubber.

20. The process of claim 1 wherein said particulate filler comprises carbon black.

* * * * *

UNITED STATES PATENT AND TRADEMARK OFFICE
CERTIFICATE OF CORRECTION

PATENT NO.         : 7,928,159 B2
APPLICATION NO.    : 11/920669
DATED              : April 19, 2011
INVENTOR(S)        : Yuan-Yong Yan Page 1 of 1

It is certified that error appears in the above-identified patent and that said Letters Patent is hereby corrected as shown below:

Col. 15, line 37, claim 1 cancel the text beginning with "1. A process" and ending with "particulate filler." at col. 12, line 49, and insert the following claim:

--1. A process for providing interaction between a functionalized polymer and particulate filler in a filled composition that comprises (1) a polymer comprising at least one functional group that comprises an acidic cation of a primary or secondary amine functionality, (2) a material comprising acid-reactive functionality, and (3) particulate filler, said process comprising:
    a) allowing said material to react with the acidic cation of said polymer (1) so as to provide a functionalized polymer comprising a primary or secondary amine functional group; and
    b) allowing the amine functional group of said functionalized polymer to interact with a particulate filler.--

Signed and Sealed this
Thirteenth Day of September, 2011

David J. Kappos
*Director of the United States Patent and Trademark Office*